United States Patent [19]

Shimizu et al.

[11] 4,275,023
[45] Jun. 23, 1981

[54] EXPANDED PARTICULATE MATERIAL OF POLYOLEFIN RESIN

[75] Inventors: Hiroshi Shimizu; Hiroshi Sato; Nobuo Miura, all of Suzuka; Shuzo Inada, Yokkaichi, all of Japan

[73] Assignee: Asahi-Dow Limited, Tokyo, Japan

[21] Appl. No.: 176,775

[22] Filed: Aug. 11, 1980

Related U.S. Application Data

[60] Division of Ser. No. 127,301, Mar. 5, 1980, which is a continuation-in-part of Ser. No. 931,946, Aug. 8, 1978.

[30] Foreign Application Priority Data

Aug. 15, 1977 [JP] Japan .................................. 52/97588
Oct. 3, 1977 [JP] Japan ............................... 52/117894

[51] Int. Cl.$^3$ .............................................. C08J 9/22
[52] U.S. Cl. ........................................ 264/50; 264/53; 264/DIG. 9; 264/DIG. 18; 521/56; 521/58; 521/60; 521/96; 521/143
[58] Field of Search ..................... 521/56, 58, 60, 143; 264/50, 53, DIG. 9, DIG. 18

[56] References Cited

U.S. PATENT DOCUMENTS

| | | | |
|---|---|---|---|
| 2,948,664 | 8/1960 | Rubens | 54/60 |
| 3,504,068 | 3/1970 | Zizlsperger | 264/41 |
| 3,616,365 | 10/1971 | Stastuy et al. | 521/60 |
| 3,709,806 | 1/1973 | Minami et al. | 521/60 |
| 3,743,611 | 7/1973 | Muroi et al. | 521/139 |
| 3,823,213 | 7/1974 | Stastuy et al. | 521/95 |
| 3,853,972 | 10/1974 | Berner | 264/53 |
| 3,886,100 | 5/1975 | Yasuda et al. | 521/60 |
| 3,953,558 | 4/1976 | Hatano et al. | 521/56 |
| 3,959,189 | 5/1976 | Kitamori | 521/60 |
| 4,108,934 | 8/1978 | Rubens et al. | 521/56 |

FOREIGN PATENT DOCUMENTS

1560630 2/1980 United Kingdom .

*Primary Examiner*—Morton Foelak
*Attorney, Agent, or Firm*—Cushman, Darby & Cushman

[57] ABSTRACT

Expanded particles of a crosslinked polyolefin resin, each particle with uniformly spherical shape, having an average diameter of 1.4 to 5.5 mm, an average expansion ratio of 18 to 37 and specific compression coefficient of $1.6 \times 10^{-3}$ to $4.0 \times 10^{-3}$, are found to be produced by two-step foaming operations. They are useful for various purposes such as filtrating material, fillers in stuffed specimens and, especially for preparation of molded articles having constricted portions, giving excellent moldings having smooth surface without failure at corner or edge portions.

3 Claims, 1 Drawing Figure

FIG. 1

EXPANDED PARTICULATE MATERIAL OF POLYOLEFIN RESIN

This is a division of application Ser. No. 127,301, filed Mar. 5, 1980, which is a continuation of Ser. No. 931,946, filed Aug. 8, 1978.

This invention relates to an expanded particulate material comprising expanded particles of a crosslinked polyolefin resin having improved characteristics, a process for producing the same and also to molded product produced therefrom.

Expanded particles of a crosslinked polyolefin resin are at present useful primarily for preparation of molded products or cushioning materials. Recently, there are provided for use as particles for internal fillers in stuffed specimens or fillers in pillows or cushions. Furthermore, the expanded particles are permitted to float in a large amount in a solution, thereby absorbing solutes on the surface of the expanded particles to separate the solutes from the solvent, and the expanded particles after recovery of the solutes absorbed thereon are regenerated for repeated use. Various uses including filtration as mentioned above are now under development.

It is well known to produce expanded particles of a crosslinked polyolefin resin from a polyolefin resin as base resin, as disclosed by, for example, Japanese published unexamined patent application No. 26435/1972. It is also known to produce molded products by filling these expanded particles in a cavity and heating into a molded article corresponding to the shape of the cavity, as disclosed by U.S. Pat. No. 3,504,068, Japanese published examined patent applications No. 34391/1973 and No. 22951/1976.

The expanded particles prepared by the processes of prior art involve drawbacks such as difference in buoyancy between particles, difference in absorbed solutes between particles or depletion in filtrating ability due to ununiform pressure deformation of particles, when applied in filtrating materials, and local deformation as the lapse of time, when applied as fillers in stuffed specimen. For this reason, applications in these fields are less advanced. Furthermore, when molded products are to be prepared by use of the expanded particles of prior art, fusion between particles in the inner portions of a part with greater thickness is poor, while there are failures at corners or edges for a part with smaller thickness. Moreover, it is entirely impossible to shorten the molding cycle for preparation of such molded products.

An object of the present invention is to provide expanded particles of a crosslinked polyolefin resin which can be provided for use as filtrating materials, being excellent in filtrating ability with appropriate pressure deformation as well as absorption of solutes, sufficiently durable to repeated uses and easy of recovery of solutes by separation, when employed, for example, in a filtrating machine which separates solutes from solvent through simple contact between the solution and the particles to thereby absorb the solutes in the solution on the surface of particles.

Another object of the present invention is to provide expanded particles of a crosslinked polyolefin which are substantially spherical with uniformity in size and expansion ratio and have specific compression coefficient, being useful as fillers for pillows or cushioning materials excellently contoured to human bodies without uneasy feeling and also as fillers for stuffed specimens, etc. free from shrinkage or partial deformation with lapse of time.

It is another object of the present invention to provide expanded particles of a crosslinked polyolefin resin which can be molded into an article by a process capable of being designed more efficiently than ever in the prior art with shortened molding cycle, said article yet having sufficient cushioning ability even at thinner portions thereof with excellent mold reproducibility at corner or edge portions of the molded article.

Still another object of the present invention is to provide a process for producing expanded particles of a crosslinked polyolefin resin which is capable of producing the novel expanded particles as mentioned above.

Further object of the present invention is to provide a process for producing an expanded molded article of a crosslinked polyolefin resin which is more efficient than prior art process and can give product with improved quality, and also to provide such an expanded molded article produced by said process.

According to the present invention, there is provided a particulate resin material comprising expanded crosslinked polyolefin resin particles which are substantially spherical, resilient, free-flowing, uniform in particle size and moldable in a cavity, each particle having a structure substantially constituted of closed cells without void, and which have an average particle size ranging from 1.4 to 5.5 millimeters, an average expansion ratio ranging from 18 to 37 based on the original volume of unexpanded resin particles and a compression coefficient ranging from $1.6 \times 10^{-3}$ to $4.0 \times 10^{-3}$ as determined from the following formula: $S/(R \times F)$ wherein S represents total energy for compression under pressure of 1 kg/cm$^2$, R average expansion ratio and F flowability, respectively, of the expanded crosslinked polyolefin resin particles.

The expanded particles of a crosslinked polyolefin resin provided by the present invention are required to satisfy the following requirements:

(a) They should be spherically shaped particles with substantially uniform size;

(b) Their average size is critically within the range from 1.4 to 5.5 mm;

(c) Each particle is filled internally with a number of closed cells and free from void;

(d) The average expansion ratio of the particles based on the volume of starting unexpanded resin particles is critically within the range from 18 to 37.

(e) The compression coefficient of the particles is critically within the range from $1.6 \times 10^{-3}$ to $4.0 \times 10^{-3}$.

The present invention has been accomplished based on the discovery that the above requirements (a) through (e) in combination are essential for achieving the excellent effect of the present invention. While being not by any theory, these parameters are necessary for the following reasons. For example, when the particles are not uniform in size as required in (a), the particles are separated into classes with different sizes during air conveying, whereby the width of variance is increased. The requirements (b), (c) and (d) are minimum necessary conditions for the value of (e) to fall within the specified range. However, if the requirements (b), (c) and (d) are satisfied, it does not necessarily follow that the value of (e) will fall within the specified range. Thus, the parameter of (e) is a factor representing the structure of the expanded particles which has not so far been elucidated. To speak of the function of the compression coefficient of (e) in detail, the particles with a compression coefficient less than $1.6 \times 10^{-3}$ will be liable to form particle bridges at the time of filling in a cavity, whereby the resultant molded product will contain vacant space at thin wall portion to lower cavity reproducibility at corner or edge portions of the molded product. Furthermore, a molded product prepared from such particles is lowered at thick wall portions in the strength of fusion between inner particles, failing to give good molded products with high cushioning ability. On the other hand, with particles having a value exceeding $4.0 \times 10^{-3}$, there is a tendency that the particles near the surface of the molded product have undergone fusion while expansion of the inner particles is delayed, whereby the resultant molded article may suffer from such inconveniences as vacant space formed therein, unfavorable changes in the strength of fusion between the inner particles or shrinkage after cooling of the molded article. Furthermore, the particles with compression coefficient in the range from $1.6 \times 10^{-3}$ to $4.0 \times 10^{-3}$ are found to be more advantageous, because molding can be completed within a short time even at a relatively lower temperature at the time of heat molding to enable shortening of molding cycle.

From the standpoint to obtain economically satisfactory results at the same time, the expanded particles of the present invention may preferably have an average particle diameter from 2 to 4.5 mm, an average expansion ratio from 23 to 32 and compression coefficient from $2.2 \times 10^{-3}$ to $3.6 \times 10^{-3}$. Using such particles, it is possible to complete a molded article with complicated shape, for example, having a thin portion of about 3 to 6 mm, in conformity with the desired shape of the mold cavity, to a great and excellent advantage.

The true mechanism in which the compression coefficient acts on the molding in a cavity remains to be elucidated. As speculated from the above results, the expanded particles at the time of filling in a cavity are required to be closely packed even in a narrow cavity through adequate deformation of the particles under compression. Furthermore, at the time of heat molding, the expanded particles are required to be adequately deformed under relatively low pressure of the steam employed for heating, thereby forming interstices between particles to permit passage of the steam deep into the cavity and effect simultaneous expansion of the expanded particles. Thus, the compression coefficient itself is the very criterion of the expanded particles for forming adequate deformation under a certain external force.

The present invention also provides a process for producing expanded particles of a crosslinked polyolefin resin, which comprises first allowing particles of a crosslinked polyolefin resin containing a foaming agent to expand to an expansion ratio of from 3 to 9 and then, after imparting expandability to the thus pre-expanded particles, further allowing said pre-expanded particles to expand to an expansion ratio of from 13 to 37.

The above specified process of the present invention is characterized by the two-step expansion, namely (A) the primary expansion in which crosslinked polyolefin resin particles are first expanded to an expansion ratio of about 3 to 9 and (B) the secondary expansion in which the above expanded particles after being endowed with expandability are further expanded to an expansion ratio of about 13 to 37 based on the original volume of unexpanded resins. It is intended by this process to establish a commercially applicable, economical process for production of highly expanded particles of a crosslinked polyolefin resin with an expansion ratio of 13 to 37, which has been difficult in prior art process in setting foaming conditions, for example, for controlling the variance of the expansion ratio of the resultant particles which is liable to occur even in the same lot. The present process is found to enable production of such expanded particles as specified above by stabilizing foaming of particles with sizes as small as 1.4 to 5.5 mm and expansion ratio of 18 to 37, which has been difficult in prior art, and moreover accomplishing uniform foaming so as to make the compression coefficient of the expanded particles within the range of $1.6 \times 10^{-3}$ to $4.0 \times 10^{-3}$.

In the primary expansion (A), if the expansion ratio is less than 3, it takes too much time before imparting expandability in the subsequent step to be uneconomical. Furthermore, highly expanded particles obtained from such a low extent of expansion suffer from greater variances. In view of the more strict requirement on the economy and the variance as mentioned above, the expansion ratio in the primary expansion (A) is desirably within the range from about 4 to 7.

The extent of expansion from the expanded particles in (A) to those in (B) may suitably be selected depending on the desired expansion ratio of the particles to be obtained in the step (B). From standpoint of making the variance smallest and effecting economically high degree of expansion, the expansion ratio to be selected for each of the steps (A) and (B) should be not more than 10, preferably from 3 to 8.

The expanded crosslinked polyolefin resin particles obtained by the above process have closed cellular structures, having a closed cell percentage of 85% or more with cell sizes ranging from 25–400 cells/mm².

There seems to be an intimate relation between the nature of the crosslinked polyolefin resin and the requisite steps of the invention to first forming expanded particles with lower expansion ratio and small extent of dispersion and then, after imparting sufficient expandability thereto, further expand to uniform, highly expanded particles. Namely, crosslinked polyolefin resin can poorly retain gaseous materials therein and crystalline in nature, thus having only a narrow temperature range for expansion. It is therefore difficult to impart expandability uniformly to the particles which will complete expansion of 10 times or higher at one time or also difficult to convert expandability imparted to the to particles to expanding force uniformly of 10 times or higher.

Unexpectedly, the present process is found to impart the compression coefficient entirely unknown in the art to the resultant expanded crosslinked polyolefin resin particles, which are uniform in foamed cell distribution as well as in size. Furthermore, the present process has made it possible to produce highly expanded small particles of crosslinked polyolefine resin which has been deemed to be difficult in the art.

In performing the primary expansion in the step (A) or imparting the expandability in the step (B), there may be employed an inorganic gas principally composed of nitrogen, typically air or nitrogen, or a volatile organic blowing agent such as hydrocarbons or halogenated hydrocarbons, which may be contained (e.g. permitted to be impregnated in the particles with heating under pressure) in the particles to impart expandability thereto, followed by expansion to achieve desired foaming. It is more preferred in the present process to carry out the primary expansion in the step (A) by impregnating the resin particles with a liquid organic blowing agent to have the organic blowing agent contained therein and then foaming with heating the thus impregnated particles to form pre-expanded particles. On the other hand, expandability may preferably be imparted to such pre-expanded particles in the subsequent step (B) by holding the pre-expanded particles in an atmosphere of an inorganic gas under high pressure (e.g. about 5 kg/cm$^2$—G) at a high temperature (e.g. about 80° C.), thereby pressure charging an inorganic gas into cells of the pre-expanded particles, which particles are then subjected to heating expansion. By use of the different foaming methods for the step (A) and the step (B), respectively, as described above there can be obtained more favorable results. Perhaps, this is due to the fact that in the step (A) a liquid organic blowing agent can be impregnated deep into the core portions of rigid particles to enable uniform foaming, while in the step (B) foaming is completed under the conditions substantially free from influences caused by latent heat, etc.

As compared with the process of the present invention as described above, the processes of prior art are not satisfactory in commercial application. For example, in a commercial scale operation wherein a number of large scale vessels with capacity of 20 m$^3$ are arranged and connected with lines therebetween for air conveying of the base resin particles and expanded particles, there are several inconveniences. For instance, in the step of bag packaging expanded particles, the bags in which said particles are packaged in equal weights as they are taken out suffer from great changes in volume, resulting in molded products having a wide range of densities. In the step for producing molded products in a system wherein storage tank of expanded particles (or tank for imparting expandability) and molding cavity are connected with a line, the resultant molded products are greatly changed in density, failing to give desired cushioning property.

In general, the entrapped gaseous material in the polyolefin resin cannot be held therein under foaming conditions as different from a polystyrene resin, but dissipated therefrom in a very short lapse of time. This characteristic is dependent also on the distribution of the gaseous materials in the particles (for example, distribution among individual particles or distribution along the cross-sectional area of each particle), and therefore it is required to have gaseous materials contained with a distribution as uniform as possible by suitable selection of conditions for impregnating a polyolefin resin with gaseous materials and expanding said resin. On the other hand, as polyolefin resins are crystalline, the range of temperatures showing an optimum viscosity suitable for foaming the resin particles is very narrow. The temperature range cannot remarkably be broadened by crosslinking the polyolefin resins. Accordingly, the gas for foaming cannot be utilized effectively if the resins are foamed under very severe conditions as compared with the expansion of polystyrene resins. The aforementioned narrowness in the range of temperatures brings about adverse effects on distribution with regard to resin expansion, e.g. distribution of expansion among particles and distribution in cell size in each particles.

There seems to be little attention paid on these considerations in the methods of prior art as mentioned above with the result that variances in density and particle volume of the expanded particles obtained are further increased through separation into classes of particles with different particle sizes and densities during air conveying. Such a variance in particle size or density has for the first time been recognized as a serious problem and investigated when production of expanded particles is performed on a large scale. This problem has been found to be most conspicuous when gaseous materials are introduced under a pressure of 10 kg/cm$^2$ or more and expansion is effected to an expansion ratio of more than 10 at one time. The process according to the present invention as described above is free from such an inconvenience and therefore can advantageously be utilized for commercial application.

The expanded particles of a crosslinked polyolefin resin according to the present invention are found to be advantageously used for molding in a cavity with ease to produce excellent molded products. By use of the expanded particles of the invention as described above, after imparting expandability thereto, there can be produced novel expanded moldings by molding in a cavity under heating according to conventional procedures. For example, as described in Example 3 of U.S. Pat. No. 3,504,068, the expanded polyolefin particles may be subjected to shrinkage under pressure with heating to 100° C. or higher, and the shrinked particles are filled in a cavity under pressure, followed by release of the pressure to atmospheric to allow expansion of the particles, whereby there is formed a molded product through fusion between the particles. Alternatively, as described on column 6, line 55 to column 7, line 7 in said Patent, heated expanded polyolefin particles are filled in a cavity and then the pressure in the cavity is increased to compress said particles, followed by reduction in volume of the cavity simultaneously with release of the pressure in the cavity to atmospheric, whereby said particles are expanded and fused into a molded product. These methods can give only molded products with considerably lower expansion ratio (i.e. higher density) than the expanded particles employed. Furthermore, due to transfer or compression of the heated particles, the resultant molded products have bad appearance quality and it is also impossible to obtain molded products having complicated shapes or good cushioning ability.

Another well known method for molding in a cavity, as disclosed in Japanese published examined patent application No. 22951/1976, comprises holding expanded particles of a crosslinked polyolefin resin in an inorganic gas atmosphere at high temperature under high pressure to thereby incorporate inorganic gas into cells of said expanded particles and increase the inner pressure in the cells (to impart expandability), which are then taken out for cooling and immediately (inner pressure being required to be maintained) filled in a cavity, followed by heating of the cavity to expand said particles to obtain molded product. This method, however, is practically disadvantageous for molding of such a resin as crosslinked polyolefin, from which gases incorporated therein are readily dissipated. For, in most commercial operations, the capacity in the process for imparting expandability does not necessarily coincide with that in the molding process for consuming the particles. Thus, it is often required to store the particles having imparted expandability as stock, whereby there is required a great labor or cost for maintenance of the expandability. Furthermore, bulk production on a commercial scale is made substantially impossible by requirement to arrange the process for imparting expandability and the molding process within a short distance. Moreover, the vital defect of this method is difficulty in recognizing the extent of expandability imparted (or remained). For this reason, it is very difficult to control the foaming in the cavity which depends largely on the expandability, resulting in considerable dispersion of the foamed products obtained.

In accordance with the present invention, there is also provided a process for producing molded products from the expanded particles of a crosslinked polyolefin as described above. The process of the present invention comprises compressing the expanded particles of a crosslinked polyolefin resin to 40 to 80% of the original particles volume thereof with heating or at normal temperature, filling the thus compressed particles in a cavity (pressure in the cavity after filling may either be atmospheric or slightly higher) and then heating directly the particles in the cavity with steam (at about 110° to 130° C.). In some cases, the resultant molded products may be allowed to reside in a drying chamber adjusted at a suitable temperature.

The advantages of the aforesaid process for producing molded product over the prior art are as follows:

(1) Molding cycle can be improved because molding is possible at a lower temperature for a short time;

(2) The molding procedure is simple to afford more economical and efficient combination of steps, since the expanded particles are only compressed and filled in a cavity immediately before molding;

(3) The molded products are uniform in quality because there is no periodical change in expandability of the expanded particles;

(4) Molding of products with smaller thickness or complicated shapes is possible because the expanded particles under compressed state are filled in a cavity without heating;

(5) Due to excellent uniformity and fusion characteristic of the particles filled in the cavity, the resultant product is excellent in cushioning property.

These advantages can be made more complete by suitable selection of the compression coefficient of the expanded particles to be employed. That is, by the pressure of the steam used for directly heating the expanded particles in a cavity at about 110° to 130° C., the expanded particles themselves are appropriately deformed under pressure to permit passage of the steam to the core portion in the cavity, whereby whole of the expanded particles in the cavity receives substantially equal heat content to effect simultaneous expansion in a short time. Further, lower temperature conditions can be applied for heating of the mold to shorten also the cooling time.

The expanded particles of a crosslinked polyolefin resin of the present invention can be molded into a product which is also novel, comprising expanded particles of a crosslinked polyolefin resin integrally closely bonded between the expanded particles, said molded product having an average density of 0.12 to 0.028 g/cm$^3$ and a compression strength (25% deformation, kg/cm$^2$) per its density (g/cm$^3$) of 14 to 18 and being substantially smooth on its surface with substantially no failure at corners or edges even at constricted portions (e.g. in a molded particle having at least a part with thickness of about 3 to 6 mm).

The polyolefin resin referred to in the present invention includes ethylene homopolymers such as high density polyethylene, medium density polyethylene or low density polyethylene or a mixture thereof and ethylenic copolymers having ethylene content of 80% or more, e.g. ethylene-vinyl acetate copolymer, ethylene-acrylic acid ester copolymer, ethylene-methacrylic acid ester copolymer, etc. The polyolefin resin to be employed in the present invention may have a melt index which is not specifically limited but generally within the range from 1.0 to 45.

There may be used any conventional procedure known in the art for crosslinking the polyolefin resin for preparation of the starting crosslinked polyolefin resin particles, using a crosslinking agent such as organic peroxides or irradiation of electron beam. It is preferred in commercial application to use a crosslinking agent selected from organic peroxides, including dicumyl peroxide; 2,5-dimethyl(2,5-di-t-butyl peroxy)hexene-3,2; α-dimethyl-α-methyl-α-ethyl benzyl peroxide and the like. The amount of such a crosslinking agent is suitably selected depending on the reaction conditions, the polyolefin resin employed and various characteristics required for the expanded product, but it generally falls within the range of from 0.35 to 1.5% by weight based on the resin. The crosslinking reaction may be performed in conventional manner known in the art, for example, by dispersing and heating resin particles containing organic peroxide in an aqueous medium. The resin particles subjected to crosslinking are spherical or shaped in pellets which can be converted to spherical shapes by heating, their average size in terms of spherical diameter being generally from 0.5 to 2.1 mm. The gel content of the resultant crosslinked resin is desired to be from 30 to 70% from standpoint of desirable foaming characteristics.

The expanded particles of a crosslinked polyolefin resin of the present invention and molded products prepared therefrom may further contain pigments or other additives dispersed therein, as incorporated in the starting resins or deposited or coated on the surfaces of the expanded particles or molded products.

In the following, definitions of the terms and the methods for evaluation or measurement are explained in detail.

(1) Particle diameter

Expanded particles are projected (×10) and the diameter of the outer circle externally contacted with the projected image for each of 100 or more particles is measured and calculated as an average diameter.

(2) Compression coefficient

This is defined by the following formula:

$$\text{Compression coefficient} = \frac{S}{R \times F}$$

Figure 1:
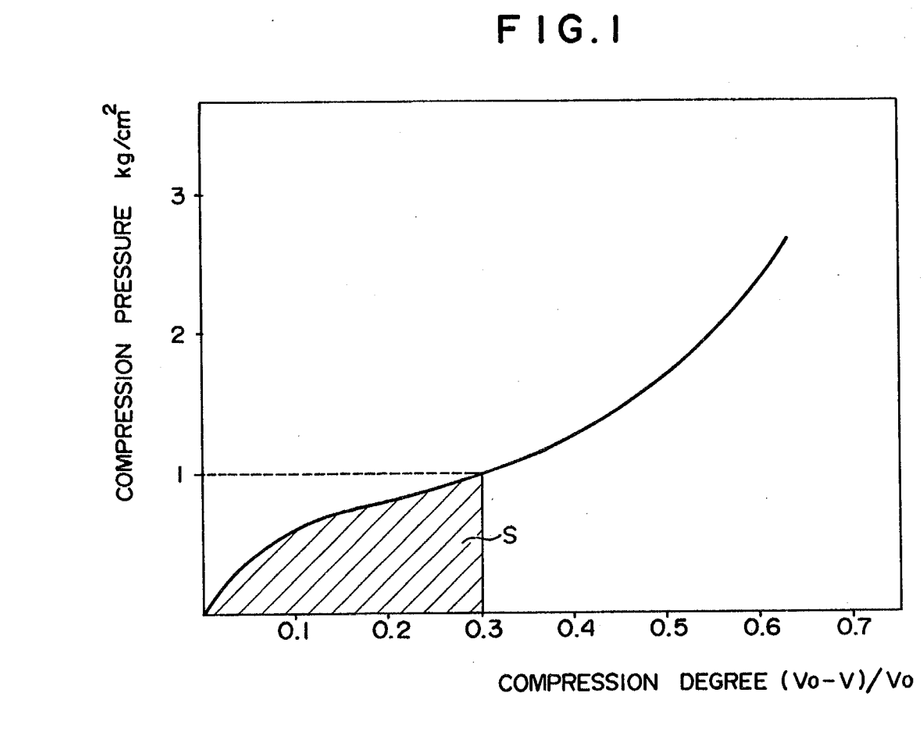

S (Total energy for compression under pressure of 1 kg/cm$^2$):

Expanded particles are dipped into water in a measuring cylinder which can be pressurized with the air to measure the volume ($V_o$) of the expanded particles. Then, the air is pressurized at, for example, 0.3 kg/cm$^2$ or 0.5 kg/cm$^2$ into the measuring cylinder and the air pressure (P) and the compressed volume (V). of the expanded particles are measured. By repeating similar procedures by increasing the pressure (P) at some regular intervals, the relation between the compressed pressure (P kg/cm$^2$) and compression degree ($V_o - V$)/$V_o$ is determined to obtain the S—S curve as shown in FIG. 1, and then total energy for compression under pressure of 1 kg/cm$^2$ is measured by integration corresponding to the area S on this curve (FIG. 1 shows one example in which the curve is made by varying the compressed pressure P at intervals of 0.5 kg/cm²)

R (Average expansion ratio):

Weight of expanded particles W(g) is precisely measured and said particles are dipped into water in a mess-cylinder to measure the volume of the expanded particles V(cc). Bulk density is determined from $\rho_1 = W/V$. Said particles are heated in nitrogen atmosphere at 160° C. for 30 minutes to determine the density $\rho_0$ of degassed resin. Expansion ratio is calculated from $\rho_0/\rho_1$, counting fractions of 0.5 or over as a whole number and disregarding the rest.

F (Flowability of resin):

Expanded particles are heated in nitrogen atmosphere at 160° C. for 30 minutes. The degassed resins obtained are subjected to measurement using a flow tester with diameter of 1 mm and length of 6 mm (flat entry) under load of 150 kg at 180° C. (pre-heated for 5 minutes). Flowability of the resin is given as falling speed of plunger (cm/sec). Flowability of resin is characteristic value representing a tendency to be deformed of the resin film constituting the expanded particles by external force, especially a tendency to be deformed by the temperature and dynamic force of heating medium in cavity molding. In Examples, the flow tester employed is produced by Shimazu Manufacturing Co., Japan.

(3) Moldability

There is prepared a test mold shaped in a box of 300×600×80(mm), with thickness at bottom of 8 mm and thickness of external walls of 25 mm, having partitioning walls (one in longitudinal direction and 24 in lateral direction) each with thickness of 6 mm and height of 25 mm. The degree of filling in the partitioned portions and filling in the edge portions of the box bottom as well as the time for heat molding are evaluated.

Filling at narrow portions:

Samples cut at 10 mm from the upper face of the partitioned portions in the above test mold are dipped into water to measure their volumes and the percentages relative to theoretical mold volume are determined. The results are rated by the following criteria.

| Rank | Filling percentage |
|---|---|
| o | 98% or more |
| Δ | less than 98%, 90% or more |
| x | lesss than 90% |

Filling at edge portions:

The number of failures with 2 mm or more per 300 mm of edge line is counted and rated by the following criteria.

| Rank | Filling degree (number of failures/300 mm) |
|---|---|
| o | less than 10 |
| Δ | 10 or more, less than 25 |
| x | 25 or more |

Molding time:

Molding is carried out by varying the total heating time for one side heating (maximum steam pressure = 0.3 kg/cm²−G) and both side heating (maximum steam pressure = 1.0 kg/cm²−G) to determine the minimum mold heating time before defects such as shrinkage or sink marks appear in the molded product and rated by the criteria set forth below. The presence of sinking is noted when the ratio of the volume of the molded product measured after being left to stand for 24 hours after molding to cavity volume is less than 0.8.

| Rank | Mold heating time (sec.) |
|---|---|
| o | less than 15 |
| Δ | 15 or more, less than 20 |
| x | 20 or more |

(4) Quality of molded product

The molded product is evaluated for its appearance, internal fusion and fusion at narrow portions.

Appearance:

The number of failures with depth of 2 mm or more are counted on the flat portion of the molded product and evaluated as follows.

| Rank | Appearance Number of failures/100 cm² |
|---|---|
| o | less than 3 |
| Δ | 4 to 20 |
| x | 21 or more |

Internal fusion:

The external wall portion of the aforesaid test mold is cut and dipped in water to the depth of 5 cm for 24 hours, thereafter taken out, washed with ethanol on its surface, dried at 35° C. for one hour and weighed. The degree of water absorbed per sample volume is calculated and evaluated as follows.

| Rank | Water absorption (vol. %) |
|---|---|
| o | less than 0.4% |
| Δ | 0.4% or more, less than 1.2% |
| x | 1.2% or more |

Fusion at narrow portions:

The partitioned sections of the molded product is cut out, its tensile strength measured and evaluated as follows.

| Rank | Variance* of tensile strength(n = 10) |
|---|---|
| o | less than 10% |
| Δ | 10 to 20% |
| x | more than 20% |

*Variance = $\dfrac{\text{Maximum value} - \text{minimum value}}{\text{Average strength}} \times 100$ (5) Overall evaluation

| Rank | |
|---|---|
| o | The marks o for all items Not more than 3 marks Δ with no mark x |
| Δ | 4 or more marks Δ with no mark x |
| x | at least one mark x |

(6) Gel content

The resin particles are dipped in toluene and refluxed with heating for 24 hours. The extract residue is represented in weight percentage.

(7) Cell size of expanded particles

The expanded particle is cut and its cross-section is observed with microscope and the number of cells per 1 mm² at 5 places are counted. The average value is calculated from the number of cells.

(8) Percentage of closed cells

The expanded particles are dipped in an aqueous solution of which surface tension is weakened with addition of surfactant at 23° C. for 24 hours, then washed with ethyl alcohol to remove water adhered on the surface followed by drying and measured for the change in weight.

$$\text{Percentage of closed cells} = \left(1 - \frac{\Delta W}{V - (W/d)}\right) \times 100$$

$\Delta W$: weight gain after dipping in water(g)
V: volume of particles(cc)
W: original weight of particles(g)
d: resin density of particles(g/cc)

(9) Melt Index (M.I.)

According to ASTM D-1238-65T (10) Variance in expansion ratio of expanded particles Samples optionally collected from the lot, each being 50 g, are subjected to classification by sieve type particle diameter distribution measuring instrument. The average expansion ratio(T) of the particles on the sieve on which maximum amount of particles remain, the average expansion ratio(M) of the whole expanded particles larger than said particles remained and the average expansion ratio(N) of the whole expanded particles smaller than said particles remained are determined.

$$\text{Variance in expansion ratio} = \frac{M - N}{T} \times 100 \, (\%)$$

EXAMPLE 1

One hundred (100) parts of a low density polyethylene pellet (density=0.921, M.I.=2.5) and 0.45 parts of dicumyl peroxide are dispersed in water in the presence of a dispersion stabilizer. The dispersion is elevated to 160° C. over 2 hours and heating is continued at 160° C. for 30 minutes to produce crosslinked polyethylene resin particles which are substantially spherical with particle diameter of 0.7 mm, having gel content of 55%.

The thus prepared particles are then treated with an excessive amount of dichlorodifluoromethane at 80° C. under 27 atm. for 30 minutes to have 15% dichlorodifluoromethane impregnated therein. The impregnated particles are allowed to expand by heating with steam at 120° C. for 14 seconds to give pre-expanded particles of crosslinked polyethylene with expansion ratio of 4.

The pre-expanded particles are held in an air-pressurized atmosphere of 9 atm. at 70° C. for 4 hours, thereby pressure charging the air into the pre-expanded particles, followed by heating at 107° C. with steam for 12 seconds for expansion to give expanded particles with expansion ratio of 23.

The above expanded particles, when measured after being left to stand for one week at normal temperature under normal pressure, is found to have compression coefficient of $3.5 \times 10^{-3}$ (S-value=0.25, flowability of resin=3.1), their particle diameter being 2 mm.

The expanded particles are compressed to 65% of original particles volume immediately before being filled in a cavity and subjected to heat molding while being filled in the cavity under compressed state. Moldability and the quality of the molded product are evaluated. As the molding machine, ECHO-120 Type machine (produced by Toyo Metal & Machinery Co., Japan) is employed. As the result, the molded product has an average expansion ratio of 24, filling ratio at narrow portion of 98%, filling degree at edge portion of 5 failures; molding time being 10 seconds (maximum steam pressure 1.0 kg/cm² gauge); appearance quality in terms of the number of failures being 3; internal fusion accounting for 0.2% (water absorption) and fusion at narrow portion for tensile strength of $3.4 \pm 0.15$ kg/cm². The results of evaluation are listed as No. 1 in Table 1.

Table 1 also shows the properties and the results of evaluation of various expanded particles which are prepared similarly as described above by varying the size of the crosslinked polyethylene resin particles and the expansion ratio of the pre-expanded particles. In Experiments Nos. 4, 5, 6, 8, 10 and 11, however, a low density polyethylene (density=0.915, M.I.=20) is employed as the starting polyethylene.

TABLE 1

| Exp. No. | $\phi_o$* (mm) | $R_p$** | R*** | Expanded particles $\phi$**** (mm) | C***** ($\times 10^3$) | Moldability — Filling capacity Narrow portion | Edge portion | Molding time | Quality of Molded product Appearance | Internal fusion | Fusion at narrow portion | Overall evaluation |
|---|---|---|---|---|---|---|---|---|---|---|---|---|
| 1 | 0.7 | 4.1 | 23 | 2.0 | 3.5 | o | o | o | o | o | o | ⊚ |
| 2 | 1.4 | 7.3 | 23 | 3.9 | 2.2 | o | o | o | o | o | o | ⊚ |
| 3 | 1.5 | 9.0 | 27 | 4.5 | 2.2 | o | o | o | o | o | o | ⊚ |
| 4 | 1.0 | 9.0 | 32 | 3.1 | 3.6 | o | o | o | o | o | o | ⊚ |
| 5 | 1.4 | 9.0 | 32 | 4.5 | 2.5 | o | o | o | o | o | o | ⊚ |
| 6 | 0.5 | 6.5 | 18 | 1.4 | 3.1 | o | o | o | o | Δ | o | o |
| 7 | 2.1 | 9.0 | 18 | 5.5 | 1.6 | Δ | o | o | Δ | o | Δ | o |
| 8 | 0.5 | 3.5 | 22 | 1.4 | 4.0 | o | o | o | o | Δ | o | o |
| 9 | 1.8 | 6.3 | 29 | 5.5 | 1.6 | Δ | o | o | Δ | o | Δ | o |
| 10 | 1.0 | 9.0 | 37 | 3.3 | 4.0 | o | o | o | o | Δ | o | o |
| 11 | 1.7 | 5.4 | 37 | 5.5 | 2.5 | Δ | o | o | Δ | o | Δ | o |

*$\phi_o$ = particle diameter of crosslinked resin;
**$R_p$ = expansion ratio of pre-expanded particles;
***R = expansion ratio of expanded particles;
****$\phi$ = particle diameter of expanded particles;
*****C = compression coefficient

COMPARISON EXAMPLE 1

To 100 parts of crosslinked polyethylene resin particles with particle diameter of 1.5 mm prepared by the same method as in Example 1 are added 20 parts of dichlorodifluoromethane to carry out impregnation treatment at 80° C. for one hour, whereby there are obtained expandable particles containing 15% of dichlorodifluoromethane.

These particles are heated with steam at 125° C. for 14 seconds to produce expanded particles with expansion ratio of 13 and particle diameter of 3.5 mm. The resultant expanded particles have a compression coefficient of $1.2 \times 10^{-3}$ (S=0.048, flowability of resin=3.1) and evaluation test of the moldability thereof and quality of the molded product give the results: filling capacity at narrow portion=98%; number of failures at edge portion=10; molding time=13 seconds; appearance quality in terms of number of failures=4; internal fusion=0.6% (water absorption); fusion at narrow portion=tensile strength of $3.1\pm0.2$ kg/cm$^2$. The results of evaluation are set forth in Table 2, No. 1.

Various expanded particles are prepared similarly as described above by varying the size of the crosslinked resin particles and the results of evaluation for these particles are also shown in Table 2. In Experiments Nos. 5, 6, 7, 8 and 9, the starting polyethylene has a density of 0.915 and M.I. of 20. The expanded particles of Nos. 5 and 7 are prepared by the two-step expansion similarly as described in Example 1.

EXAMPLE 2

Using a low density polyethylene (density=0.921, M.I.=3.5), crosslinked resin particles with diameter of 1 mm are prepared by the same method as in Example 1. From the crosslinked resin particles, there are produced various pre-expanded particles with different expansion ratios which are then subjected to further expansion, respectively, to prepare expanded particles. The expansion ratios of respective expanded particles, variances of expansion ratios and compression coefficients thereof are shown in Table 3.

As apparently seen from Table 3, it is preferable to first pre-expand the particles to an expansion ratio of 3 to 9 and then expand the pre-expanded particles to an expansion ratio of 13 to 37 in order to make the variance in expansion ratio smaller; more preferably first to an expansion ratio of 4 to 7 and then to an expansion ratio of 18 to 37.

TABLE 3

| Exp. No. | Expansion ratio in pre-expansion | Expanded particles Expansion ratio | Variance (%) | Compression coefficient ($\times 10^3$) |
|---|---|---|---|---|
| 1 | 10 | 37 | 40 | 3.5 |
| 2 | 10 | 35 | 38 | 3.0 |
| 3 | 9.0 | 37 | 20 | 4.0 |
| 4 | " | 35 | 18 | 3.6 |
| 5 | " | 32 | 11 | 2.5 |
| 6 | 7.0 | 37 | 14 | 4.0 |
| 7 | " | 32 | 10 | 3.5 |
| 8 | " | 23 | 8.5 | 2.2 |
| 9 | " | 18 | 9.2 | 3.0 |
| 10 | 4.0 | 23 | 9.3 | 2.6 |
| 11 | " | 18 | 11 | 1.6 |
| 12 | 3.0 | 18 | 18 | 2.4 |
| 13 | " | 13 | 15 | 1.4 |
| 14 | 2.3 | 21 | 36 | 1.0 |

EXAMPLE 3

Using various polyolefin resins, the following expanded particles are prepared.

(1) A high density polyethylene (density=0.951, M.I.=10) is formed into substantially spherical particles. Said particles are irradiated with electron beam to prepare crosslinked polyethylene particles with gel content of 40%. Subsequently, dichlorotetrafluoroethane is impregnated into the crosslinked polyethylene particles at 40° C. under pressure for one hour, followed by heating with steam at 140° C. for 20 seconds to give primarily expanded particles with expansion ratio of 7. These primarily expanded particles are held in an air-pressurized atmosphere of 9.5 atm., at 90° C. for 8 hours, thereby pressure charging the air into the expanded particles, followed by heating with steam at 140° C. for 15 seconds to prepare secondarily expanded particles with expansion ratio of 24. The resultant expanded particles have the properties as shown in Table 4.

(2) Using the resins as shown in Table 4, various expanded particles are prepared according to the same procedure as described in (1). The heating conditions for expansion of the respective resins are as follows:

Polyethylene(density = 0.915, M.I. = 10)  120° C.,  10 to

TABLE 2

| Exp. No. | $\phi_0$* (mm) | $R_p$** | R*** | $\phi$**** (mm) | C***** ($\times 10^3$) | Moldability Filling capacity Narrow portion | Edge portion | Molding time | Quality of molded product Appearance | Internal fusion | Fusion at narrow portion | Overall evaluation |
|---|---|---|---|---|---|---|---|---|---|---|---|---|
| 1 | 1.5 | — | 13 | 3.5 | 1.2 | o | Δ | o | Δ | Δ | Δ | Δ |
| 2 | 2.0 | — | 20 | 5.5 | 1.0 | Δ | Δ | Δ | Δ | x | Δ | x |
| 3 | 2.0 | — | 29 | 6.0 | 1.3 | x | o | Δ | Δ | Δ | x | x |
| 4 | 2.1 | — | 28 | 6.5 | 0.9 | x | Δ | x | Δ | Δ | x | x |
| 5 | 0.5 | 2.5 | 13 | 1.2 | 3.4 | o | o | o | o | x | Δ | x |
| 6 | 0.4 | — | 22 | 1.2 | 4.2 | o | o | o | Δ | x | Δ | x |
| 7 | 0.9 | 12 | 37 | 3.0 | 4.2 | o | o | o | Δ | x | Δ | x |
| 8 | 1.1 | — | 39 | 3.7 | 4.0 | o | o | o | Δ | x | Δ | x |
| 9 | 1.7 | — | 39 | 5.9 | 2.3 | Δ | o | Δ | Δ | Δ | Δ | Δ |

*$\phi_0$ = particle diameter of crosslinked resin;
**$R_p$ = expansion ratio of pre-expanded particles;
***R = expansion ratio of expanded particles;
****$\phi$ = particle diameter of expanded particles;
*****C = compression coefficient -continued

| | | |
|---|---|---|
| Polyethylene(density = 0.921,M.I. = 3.5) | " | 20 sec. 10 to 20 sec. |
| Polyethylene(density = 0.926,M.I. = 20) | " | 10 to 20 sec. |
| Methyl acrylate(10%)-ethylene(90%) (M.I. = 3.0) | 125° C., | 10 to 20 sec. |
| Vinyl acetate(10%)-ethylene(90%) (M.I. = 2.5) | 90° C., | 10 to 15 sec. |

TABLE 4

| Polymer | Particle diameter (mm) | Expansion ratio | Variance | Compression coefficient (× 10³) |
|---|---|---|---|---|
| Polyethylene (d = 0.951, M.I. = 10) | 3.5 | 24 | 17 | 1.8 |
| Polyethylene (d = 0.915, M.I. = 10) | 3.5 | 24 | 8.5 | 2.3 |
| Polyethylene (d = 0.921, M.I. = 3.5) | 3.5 | 24 | 8.3 | 2.6 |
| Polyethylene (d = 0.926, M.I. = 20) | 3.5 | 24 | 8.4 | 2.4 |
| Methyl acrylate(10%)-ethylene(90%) copolymer(M.I. = 3.0) | 3.5 | 24 | 9.2 | 1.6 |
| Vinyl acetate(10%)-ethylene(90%) copolymer(M.I. = 2.5) | 3.5 | 24 | 20 | 3.6 |

EXAMPLE 4

The pre-expanded particles prepared in the same manner as in Example 1 are subjected to treatment under the conditions set forth below for imparting expandability thereto, and then secondarily expanded particles are prepared.

TABLE 5

| | Exp. No. | | | | |
|---|---|---|---|---|---|
| | 1 | 2 | 3 | 4 | 5 |
| Conditions for imparting expandability | | | | | |
| Added gas | Di-chloro-difluror-methane | Pro-pane | Dichloro-difluoro-methane (20%) Nitrogen | Ni-tro-gen | Air |
| Pressure (kg/cm²-G) | 10 | 10 | (80%) 10 | 10 | 10 |
| Temperature (°C.) | 45 | 28 | 80 | 80 | 80 |
| Time (hour) | 6 | 8 | 4 | 4 | 4 |
| Secondary expansion | | | | | |
| Heated steam pressure(kg/cm²-G) | 0.5 | 0.5 | 0.33 | 0.32 | 0.31 |
| Heating time(sec.) | 30 | 30 | 30 | 25 | 24 |
| Quality of expanded product | | | | | |
| Expansion ratio | 25 | 25 | 30 | 30 | 30 |
| Variance (%) | 35 | 30 | 10.0 | 9.5 | 9.3 |
| Compression coefficient (× 10³) | 1.8 | 1.6 | 2.9 | 2.8 | 2.8 |

As clearly shown from Table 5, when an organic gas is used as foaming gas, heat content necessary for expansion is greater due to latent heat for evaporation of an organic gas, whereby dispersion tends to be increased. Further, in such a case, the expanded particles to which expandability is imparted differ in thermal conductivity to form different cellular structures at the time of secondary expansion, resulting in decreased compression coefficient.

EXAMPLE 5

Using the secondarily expanded particles prepared in the same manner as in Example 1, there are prepared several compression moldings under the following conditions to give the results as shown in Table 6. The molding cavity employed is shaped in a box having outer dimensions of 300×300×100(mm), thickness of outer wall of 25 mm, and also having inner partitioning walls (2×2 sheets) with thickness of 9 mm. Compression molding is carried out under maximum steam pressure of 1.0 kg/cm²—G at the time of heat molding. In preparing the expanded particles of Experiments Nos. 1 and 2, in order to prevent loss of foaming ability through diffusion of the gases added into the particles, the expanded particles after being endowed with expandability are taken out successively portionwise corresponding to the amount to be molded and then immediately filled in the molding cavity for heat molding.

TABLE 6

| | Exp. No. | | | | | | |
|---|---|---|---|---|---|---|---|
| | 1 | 2 | 3 | 4 | 5 | 6 | 7 |
| Secondarily expanded particles; | | | | | | | |
| Diameter(mm) | 3.9 | 3.9 | 4.5 | 4.5 | 4.5 | 4.5 | 4.5 |
| Expansion ratio | 23 | 23 | 32 | 32 | 32 | 32 | 32 |
| Compression coefficient(× 10³) | 2.2 | 2.2 | 2.5 | 2.5 | 2.5 | 2.5 | 2.5 |
| Method for imparting expandability: | | | | | | | |
| Foaming gas added | Dichloro-difluoro-methane | Air | — | — | — | — | — |
| Treatment pressure(kg/cm²-G) | 13 | 10 | — | — | — | — | — |
| Treatment temperature(°C.) | 65 | 65 | — | — | — | — | — |
| Treatment time(minutes) | 30 | 20 | — | — | — | — | — |
| Method for compression: | — | — | Air compression | | | | |
| Decrease of particles volume by compression | — | — | 20 | 30 | 40 | 50 | 60 |
| Treatment temperature(°C.) | — | — | 23 | 23 | 23 | 23 | 23 |
| Treatment time(sec.) | — | — | 10 | 15 | 20 | 25 | 30 |
| Moldability: | | | | | | | |
| Filling in narrow portion | o | o | o | o | o | o | o |
| Filling in edge portion | o | o | o | o | o | o | o |
| Molding time(sec.) | 20 60 | 10 20 | 8 | 10 | 10 | 12 | 15 |
| Quality of the product: | | | | | | | |
| Appearance | Δ o | Δ o | o | o | o | o | o |

TABLE 6-continued

| | Exp. No. | | | | | | |
|---|---|---|---|---|---|---|---|
| | 1 | 2 | 3 | 4 | 5 | 6 | 7 |
| Internal fusion | x Δ | x Δ | o | o | o | Δ | Δ |
| Fusion at narrow portion | Δ o | Δ o | Δ | o | o | Δ | Δ |
| Density(g/cc) | 0.033 | 0.033 | 0.032 | 0.033 | 0.035 | 0.040 | 0.043 |

EXAMPLE 6

In this Example, the following tests are conducted for evaluation of the ranges for various parameters required for moldability.

There is employed a box-shaped cavity for testing of which outer dimensions are 200×400×100(mm) with outer wall thickness of 20 mm, partitioning walls with length of 160 mm, height of 50 mm and thicknesses of 2, 3, 4, 5, 6, 8, 10 and 15 mm being arranged at intervals of 34 mm in said cavity. Heating for each molding is carried out under the condition optimized for each of the expanded particles. Thickness of the partitioning wall in which filling percentage of the particles is 98% or higher, the number of failures per 300 mm of inner edge of the wall surface, the number of failures per 100 cm$^2$ of the box bottom and compression strength (25% compression, kg/cm$^2$) per density (g/cc) of the molded product are determined to give the results as shown in Table 7.

Table 7 clearly shows that the products obtained by use of the expanded particles of the present invention are more flexible than the expanded moldings of prior art, and particularly that even the articles having smaller thickness portions with excellent quality can be molded by compression molding.

TABLE 7

| | Expanded particles | | Conditions for imparting foaming ability | Minimum moldable thickness (mm) | Number of failures at edge portion | Number of failures at bottom | Compression strength (kg/cm$^2$)/ density(g/cc) |
|---|---|---|---|---|---|---|---|
| Exp. No. | Particle diameter (mm) | Compression coefficient (× 10$^3$) | | | | | |
| 1 | 2.0 | 3.5 | compression to 65% filling as in Example 1 | 3 | 3 | 2 | 14 |
| 2 | 3.9 | 2.2 | compression to 65% filling as in Example 1 | 4 | 5 | 3 | 18 |
| 3 | 4.5 | 2.2 | compression to 65% filing as in Example 1 | 6 | 4 | 3 | 17 |
| 4 | 3.1 | 3.6 | compression to 65% filling as in Example 1 | 2 | 6 | 2 | 16 |
| 5 | 5.5 | 1.6 | Example 5 No. 2 | 10 | 6 | 3 | 18 |
| 6 | 3.5 | 1.2 | Example 5 No. 2 | 6 | 6 | 4 | 23 |
| 7 | 5.5 | 1.0 | Example 5 No. 2 | 10 | 7 | 4 | 20 |
| 8 | 5.9 | 2.3 | compression to 65% filling as in Example 1 | 10 | 8 | 4 | 22 |

What we claim is:

1. A process for producing expanded crosslinked polyolefin resin particles, which comprises first allowing particles of a crosslinked polyolefin resin containing a foaming agent to expand to an average expansion ratio of from 3 to 9 and thereafter imparting further expandability to the thus pre-expanded particles by impregnating with a gas under a pressurized atmosphere, further allowing said pre-expanded particles to expand to an average expansion ratio of from 13 to 37, said average expansion ratio being based on the original volume of unexpanded resin particles said expanded particles having an average density of 0.12 to 0.028 g/cm$^3$ and a compression coefficient ranging from $1.6 \times 10^{-3}$ to $4.0 \times 10^{-3}$ as determined from the following formula: S/(R×F) wherein S represents total energy for compression under pressure of 1 kg/cm$^2$, R average expansion ratio and F flowability, respectively, of the expanded crosslinked particles, said particles having an average particle size ranging from 1.4 to 5.5 millimeters.

2. A process for producing expanded crosslinked polyolefin resin particles as in claim 1, wherein expandability is imparted to the pre-expanded particles by impregnating the pre-expanded particles with an inorganic gas principally composed of nitrogen under a pressurized atmosphere.

3. A process for producing a molded article as in claim 1, wherein the process comprises the steps of first compressing the expanded particles in said particulate resin material to 40 to 80% of their original volume, then filling the thus compressed particles under compressed state in a cavity which can confine but does not seal and thereafter effecting molding under heating said molded article having a compression strength (kg/cm$^2$ at 25% compression) per its density (g/cm$^3$) of 14 to 18.

* * * * *